US009078455B2

(12) United States Patent
Sharp et al.

(10) Patent No.: US 9,078,455 B2
(45) Date of Patent: *Jul. 14, 2015

(54) PROCESS FOR MANUFACTURING TEA PRODUCTS

(75) Inventors: David George Sharp, Sharnbrook (GB); Alistair David Smith, Sharnbrook (GB)

(73) Assignee: Conopco, Inc., Englewood Cliffs, NJ (US)

( * ) Notice: Subject to any disclaimer, the term of this patent is extended or adjusted under 35 U.S.C. 154(b) by 141 days.

This patent is subject to a terminal disclaimer.

(21) Appl. No.: 13/635,708

(22) PCT Filed: Mar. 9, 2011

(86) PCT No.: PCT/EP2011/053562
§ 371 (c)(1),
(2), (4) Date: Sep. 18, 2012

(87) PCT Pub. No.: WO2011/117075
PCT Pub. Date: Sep. 29, 2011

(65) Prior Publication Data
US 2013/0011518 A1 Jan. 10, 2013

(30) Foreign Application Priority Data
Mar. 25, 2010 (EP) .................................. 10157812

(51) Int. Cl.
A23F 3/14 (2006.01)
A23F 3/08 (2006.01)
A23F 3/16 (2006.01)

(52) U.S. Cl.
CPC .... *A23F 3/08* (2013.01); *A23F 3/16* (2013.01)

(58) Field of Classification Search
CPC ............. A23F 3/163; A23F 3/14; A23F 3/18; A23F 3/06; A23F 3/08; A23F 3/10; A23F 3/12; A23F 3/34; A23F 3/16; A23F 3/40; A23F 3/30; A61K 36/82
USPC ........... 426/435, 489, 472, 481, 640, 52, 597, 426/590, 49
See application file for complete search history.

(56) References Cited

U.S. PATENT DOCUMENTS

| | | | |
|---|---|---|---|
| 3,438,785 A | 4/1969 | Zameitat et al. | |
| 3,821,440 A | 6/1974 | Reeve | |
| 4,534,983 A | 8/1985 | Koene | |
| 5,879,733 A | 3/1999 | Ekanayake | |
| 6,113,965 A | 9/2000 | Goodsall | |
| 6,462,051 B1 | 10/2002 | Nozawa | |
| 7,108,877 B2 | 9/2006 | Blair et al. | |
| 2005/0287278 A1 | 12/2005 | Quan | |
| 2006/0134300 A1 | 6/2006 | Newman | |
| 2006/0159829 A1 | 7/2006 | Owen | |
| 2007/0009640 A1 | 1/2007 | Hiramoto et al. | |
| 2007/0048429 A1 | 3/2007 | Griffiths et al. | |
| 2007/0071870 A1 | 3/2007 | You | |
| 2007/0264393 A1 | 11/2007 | Spisak | |
| 2007/0292560 A1 | 12/2007 | Quan et al. | |
| 2008/0131558 A1 | 6/2008 | Hodges et al. | |
| 2009/0117229 A1 * | 5/2009 | Colliver et al. | 426/49 |
| 2009/0202676 A1 | 8/2009 | Colliver et al. | |
| 2010/0086642 A1 * | 4/2010 | Colliver et al. | 426/49 |

FOREIGN PATENT DOCUMENTS

| | | |
|---|---|---|
| CN | 1058135 | 1/1992 |
| CN | 1059078 | 3/1992 |
| CN | 1039525 | 8/1998 |
| CN | 1356054 | 7/2002 |
| CN | 1396249 | 2/2003 |
| CN | 1640282 | 7/2005 |
| CN | 1219359 | 9/2005 |
| CN | 1718030 | 1/2006 |
| CN | 1266625 | 7/2006 |
| CN | 101002587 | 7/2007 |
| CN | 101044878 | 10/2007 |
| CN | 101385491 A | 3/2009 |
| CN | 101481281 A | 7/2009 |
| FR | 2789268 | 8/2000 |
| GB | 1284721 | 8/1972 |
| GB | 1329612 | 9/1973 |
| GB | 2095968 A | 10/1982 |
| GB | 2348104 A | 9/2007 |
| IN | 195073 B | 12/2004 |
| JP | 02184626 | 7/1990 |
| JP | 02203746 | 8/1990 |
| JP | 05211838 | 8/1993 |

(Continued)

OTHER PUBLICATIONS

C R Harler, ., Tea Manufacture, Tea Manufacture, ., p. 26, Oxford University Press—1963, US.
Cooper et al., 2005, Medicinal Benefits of Green Tea: Part I. Review of Noncancer Health Benefits, The Journal of Alternative and Complementary Medicine, vol. 11 No. 3, 521-528, Mary Ann Liebert, Inc., .
Frosti, Jun. 25, 1993, Reverse osmosis transport for green tea juice, Journal of Food Process Engineering, 16(1), pp. 1-20, Frosti, US.
Hideyuki, 2007, Notices JP 2007-082526, Machine Translation, ., .
Iso, Mar. 1, 2005, Determination of substances green and black tea, International Standard, 1st Ed. ISO 14502-1, pp. 1-10, International Standard, US.
Iwaasa, Aug. 29, 1994, Cultivation & Utilisation/Processing of Tea, KK Yokendo, 1st Ed., 370-371, JP.
Kyoto, May 1, 2009, Development of tea extract powder, Kyoto, N/A, pp. 1-3, Kyoto, US.

(Continued)

*Primary Examiner* — Hamid R Badr
(74) *Attorney, Agent, or Firm* — Ellen Plotkin

(57) ABSTRACT

Disclosed is a process comprising the steps of: expressing juice from a supply of fresh tea leaves thereby to produce leaf residue and tea juice; subjecting the supply of fresh tea leaves and/or the tea juice to a fermentation step thereby to at least partially ferment the tea juice; and combining the at least partially fermented tea juice with substantially unfermented tea material comprising active endogenous enzymes, thereby to form a mixture; and subjecting the mixture to an enzyme deactivation step thereby to prevent fermentation of the substantially unfermented tea material in the mixture.

8 Claims, No Drawings

(56) References Cited

FOREIGN PATENT DOCUMENTS

| | | |
|---|---|---|
| JP | 05292883 | 11/1993 |
| JP | KR1019940004838 | 6/1994 |
| JP | 06233666 | 8/1994 |
| JP | 07203849 | 8/1995 |
| JP | 8109104 | 4/1996 |
| JP | 09275903 | 10/1997 |
| JP | 4409275903 A | 10/1997 |
| JP | 10099021 | 4/1998 |
| JP | 10101624 | 4/1998 |
| JP | 10165095 | 6/1998 |
| JP | 11346654 | 6/1998 |
| JP | 10304822 | 11/1998 |
| JP | 11009188 | 1/1999 |
| JP | 11056243 | 3/1999 |
| JP | 110562543 | 3/1999 |
| JP | 200060427 | 2/2000 |
| JP | 200125824 | 5/2000 |
| JP | 2000125824 | 5/2000 |
| JP | 2002282369 | 9/2002 |
| JP | 2003061581 | 3/2003 |
| JP | 2003111558 | 4/2003 |
| JP | 2003125705 | 5/2003 |
| JP | 2003164259 | 6/2003 |
| JP | 2003164261 | 6/2003 |
| JP | 2003225054 | 8/2003 |
| JP | 2004041237 | 2/2004 |
| JP | 2004089146 | 3/2004 |
| JP | 2004168686 | 6/2004 |
| JP | 20050019588 | 1/2005 |
| JP | 2005204527 | 8/2005 |
| JP | 2006131512 | 5/2006 |
| JP | 2006136270 | 6/2006 |
| JP | 2006206483 | 8/2006 |
| JP | 2007082526 | 4/2007 |
| KR | 19940000775 | 1/1994 |
| KR | 1020090009042 | 1/2009 |
| SU | 326797 | 12/1972 |
| SU | 854353 | 8/1981 |
| SU | 929041 | 5/1982 |
| SU | 1153873 | 5/1985 |
| WO | WO9823164 | 6/1998 |
| WO | WO0170038 A2 | 9/2001 |
| WO | WO2005020700 | 3/2005 |
| WO | WO2005039301 A1 | 6/2005 |
| WO | WO2005067727 A1 | 7/2005 |
| WO | WO2006021317 A1 | 3/2006 |
| WO | WO2006037504 A1 | 4/2006 |
| WO | WO2006037511 A1 | 4/2006 |
| WO | WO2007098931 A1 | 9/2007 |
| WO | WO2010037768 A1 | 4/2010 |
| WO | WO2010037769 A1 | 4/2010 |

OTHER PUBLICATIONS

Matsuura et al., Mar. 5, 1990, Effects of Precusor Temperature and Illumination, Agric Biol Chem 1990 54 9 pp. 2283-2286, vol. 54 No. 9, 2283-2286, US.

Mei, Apr. 10, 2005, Current Research & Dev in Processing of Fresh Green Tea, Chinese Tea Processing, 2, pp. 23-24, 29, China Academic Journal Electronic Publishing, CN.

Peters, Mar. 27, 2000, Does Tea affect cardiovascular disease, American Journal of Epidermiology, vol. 154, No. 6, 495, John Hopkins University, US.

Sawai, et al., Jan. 1, 1999, Content of 7-Aminobutyric Acid in Stems of Tea Shoots, Journal of Food Sc Tech Soc of Japan, 46, No. 4, 374-377, JP.

Shanyang, et al., Jan. 1, 1988, Test study of a fresh tea leaves chopper, Journal of Zhejiang Agricultural Univ, 14(2), 206-211, JP.

Sinija, Jan. 27, 2007, Process technology for production of solube tea powder, Journal of Food Engineering, 82, 276-283, Elsevier, US.

Tangheng, Jan. 1, 1992, Extracting of Fresh Tea Juice for Processing Instant Tea, Acta Agriculturae Universitatis Zhejiangensis, 18(S), 99-103, CN.

Wen-Li, Jan. 1, 2003, Quality comparison of fresh green tea juice & green tea liquor, Journal of Tea, 29(4), pp. 215-216, Zhejiang University, US.

Wen-Li, May 1, 2004, Research on the quality & processing tech of fresh green tea juice, Zhejiang University, N/A, N/A, Zhejiang University, US.

Wen-Li, Aug. 26, 2003, Quality Comparison Fresh Green Tea Baked Green Tea, Journal of Tea, 29 (4), 215-216, Zhejiang University, US.

Willson, Oct. 12, 1992, Tea Cultivation to consumption, Chapman & Hall, 1st Ed., 412-600, Chapman & Hall, US.

Zhang, Jan. 1, 1985, Extraction and processing of fresh tea juice, Chinese Agricultural Science Bulletin, 4, 22, CN.

Zhang, Aug. 15, 2001, Expressing juice from tea does not impair the tea's nutrition, Xinhua Daily Telegraph, *, 7, CN.

Zhejiang Univ, Jun. 10, 2004, Process Procedures Product Quality of Green Tea Juice, Zhejiang University, N/A, N/A, Zhejiang University, US.

Search Report in EP10157812, Jun. 30, 2010, EP.

Search Report in PCTEP2011053562, Apr. 4, 2011, WO.

Written Opinion in PCTEP2011053562, Apr. 4, 2011, -, WO.

* cited by examiner

PROCESS FOR MANUFACTURING TEA PRODUCTS

TECHNICAL FIELD OF THE INVENTION

The present invention relates to a process for manufacturing a tea product. More particularly the present invention relates to tea products obtained by combining fermented tea juice with unfermented tea material.

BACKGROUND TO THE INVENTION

Beverages based on the tea plant (*Camellia sinensis*) have been popular throughout the world for many hundreds of years. Traditionally such beverages are produced by infusing leaf tea in hot water.

Most of the tea consumed in the Western World is so-called black tea which is obtained by harvesting leaves of the plant *Camellia sinensis* and withering, rolling, enzymatically oxidizing (fermenting), firing and sorting them. However the leaves can be processed without the fermentation step to produce what is known as green tea. Such tea is widely consumed in parts of the People's Republic of China, Japan, North Africa and the Middle East. In another variation oolong tea is prepared by partial fermentation.

Tea leaves contain a large number of enzymes, biochemical intermediates and structural elements normally associated with plant growth and photosynthesis together with substances that are responsible for the characteristics of tea itself. These include flavanols, flavanol glycosides, polyphenolic acids, caffeine, amino acids, mono- and polysaccharides, proteins, cellulose, lipids, chlorophylls and volatiles.

Flavanols or more specifically flavan-3-ols tend to constitute up to 30% of the dry weight of freshly picked tea leaves and are known as catechins. Green tea retains most of the catechins, but their content in black tea is greatly reduced due to both chemical and enzymatic oxidations taking place during fermentation to give theaflavins and thearubigins.

Catechins have been claimed to possess a variety of biological activities including anti-tumour activity and effects on modulating body shape and/or body fat.

As well as affecting tea colour, theaflavins have been recognised as providing the "brightness" and "briskness" quality attributes of black tea. In fact, theaflavin content is known to correlate with the quality of black tea. Moreover, theaflavins have been shown to have several positive health benefits. The purported benefits include lowering blood lipid levels (e.g. cholesterol), anti-inflammation effects and anti-tumour effects.

Tea contains many other phenols. These include gallic acid, flavanols such as quercetin, kaemferol, myricetin, and their glycosides; and depsides such as chlorogenic acid and para-coumarylquinic acid. Some of these are believed to participate in the chemical reactions that occur during fermentation.

Green tea contains many more catechins than black tea. However despite the burgeoning health consciousness amongst many consumers green tea is usually dismissed in Western countries as being too pale and unpleasant to taste. Furthermore it is typically slow to infuse and therefore not suitable for the Western desire for convenience for the sake of quality. Further still, some of the health benefits afforded by the theaflavins of black tea may not be provided by the catechins of green tea. In order to overcome some of these drawbacks, efforts have been made to provide tea products having the advantageous properties of both black and green tea.

WO 98/23164 (Unilever) discloses a leaf tea comprising a blend of a first substantially fermented tea and a second substantially unfermented tea, characterised in that the blend contains catechins and phenols in a ratio of between 0.15 to 0.4. This document also teaches that the ratio of gallated to non-gallated catechins is related to bitterness and thus tea clones having a low ratio of gallated to non-gallated catechins are preferred.

WO 2009/059927 discloses that the amount of caffeine in tea juice expressed from dhool decreases with the degree of fermentation. Furthermore fermented tea juice typically has a lower proportion of gallated theaflavins compared with conventional tea extracts and the proportion of gallated theaflavins in the juice also varies with the degree of fermentation before expression. Thus we have recognised that fermented tea juice can be added to unfermented tea material to increase the black tea character thereof whilst not imparting excessive bitterness from gallated theaflavins and/or without bringing large amounts of caffeine.

In addition, we have now found that by combining fermented juice with unfermented dhool before deactivating the enzymes in the unfermented dhool, tea products with exceptional infusion performance can be created.

TESTS AND DEFINITIONS

Tea

"Tea" for the purposes of the present invention means material from *Camellia sinensis* var. *sinensis* and/or *Camellia sinensis* var. *assamica*. Especially preferred is material from var. *assamica* as this has a higher level of tea actives than var. *sinensis*.

"Leaf tea" for the purposes of this invention means a tea product that contains tea leaves and/or stem in an uninfused form, and that has been dried to a moisture content of less than 30% by weight, and usually has a water content in the range 1 to 10% by weight (i.e. "made tea").

"Green tea" refers to substantially unfermented tea. "Black tea" refers to substantially fermented tea. "Oolong tea" refers to partially fermented tea.

"Fermentation" refers to the oxidative and hydrolytic process that tea undergoes when certain endogenous enzymes and substrates are brought together, e.g., by mechanical disruption of the cells by maceration of the leaves. During this process colourless catechins in the leaves are converted to a complex mixture of yellow and orange to dark-brown polyphenolic substances.

"Fresh tea leaves" refers to tea leaves and/or stem that have never been dried to a water content of less than 30% by weight, and usually have a water content in the range 60 to 90%.

"Dhool" refers to macerated fresh tea leaves.

Expressing Juice

As used herein the term "expressing juice" refers to squeezing out juice from fresh tea leaves using physical force, as opposed to extraction of tea solids with the use of a solvent. Thus the term "expressing" encompasses such means as squeezing, pressing, wringing, spinning and extruding. It is possible that a small amount of solvent (e.g. water) is added to the leaves during the expression step. However, in order to prevent significant extraction of tea solids by the solvent, the moisture content of the leaves during expression is that of fresh tea leaves as defined hereinabove. In other words, during the expression step, the moisture content of the fresh tea leaves is between 30 and 90% by weight, more preferably between 60 and 90%. It is also preferred that the fresh leaves are not contacted with non-aqueous solvent (e.g. alcohols)

prior to or during expression, owing to the environmental & economic problems associated with such solvents.

Catechins

As used herein the term "catechins" is used as a generic term for catechin, gallocatechin, catechin gallate, gallocatechin gallate, epicatechin, epigallocatechin, epicatechin gallate, epigallocatechin gallate, and mixtures thereof.

Theaflavins

As used herein the term "theaflavins" is used as a generic term for theaflavin, theaflavin-3-gallate, theaflavin-3'-gallate, theaflavin-3,3'-digallate and mixtures thereof. The structures of these compounds are well-known (see, for example, structures xi-xiv in Chapter 17 of "Tea—Cultivation to consumption", K. C. Willson and M. N. Clifford (Eds), 1992, Chapman & Hall, London, pp. 555-601). The theaflavins are sometimes referred to using the shorthand notation TF1-TF4 wherein TF1 is theaflavin, TF2 is theaflavin-3-gallate, TF3 is theaflavin-3'-gallate and TF4 is theaflavin-3,3'-digallate (or simply "theaflavin digallate"). The term "gallated theaflavins" is used as a generic term for TF2, TF3, TF4 and mixtures thereof.

Determination of Catechins and Caffeine in Leaf Tea

The amounts of catechins and caffeine in leaf tea are determined simultaneously by reverse-phase HPLC as follows.

Sample Preparation

1. Grind the leaf tea using a Cyclotech™ 1093 sample mill (FOSS Ltd, Warrington, Cheshire, UK) fitted with a 0.5 μm screen, until a fine powder is achieved.

2. Weigh accurately approximately 200 mg of the ground tea into an extraction tube, and record the mass.

3. Warm at least 20 ml of a methanol-water solution (70% v/v methanol in distilled water) to 70° C.

4. Add 5 ml of the hot methanol-water solution to the extraction tube. Gently mix the methanol-water and tea material on a vortex mixer; place in a water bath at 70° C. for 5 minutes; mix again and then place in a water bath at 70° C. for a further 5 minutes.

5. Gently mix the methanol-water and tea material on a vortex mixer again and then allow too cool for a 10 minutes at an air temperature of 20° C.

6. Centrifuge the extraction tube at a relative centrifugal force (RCF) of 2900 g for 10 minutes.

7. The extraction tube should now contain a liquid supernatant on top of a plug of tea material. Carefully decant supernatant into a clean graduated test tube.

8. Add 5 ml of the hot methanol-water solution to the plug in the extraction tube. Gently mix the methanol-water and tea material on a vortex mixer; place in a water bath at 70° C. for 5 minutes; mix again and then place in a water bath at 70° C. for a further 5 minutes.

9. Gently mix the methanol-water and tea material on a vortex mixer again and then allow too cool for a 10 minutes at an air temperature of 20° C.

10. Centrifuge the extraction tube at a RCF of 2900 g for 10 minutes.

11. The extraction tube should now contain a liquid supernatant on top of a plug of tea material. Carefully decant supernatant into the graduated test tube containing the supernatant from step 7.

12. Make up the pooled supernatants to 10 ml with the methanol-water solution.

13. Add 1 ml of a solution of 2.5 mg/ml EDTA and 2.5 mg/ml ascorbic acid in distilled water to the graduated test tube.

14. Dilute 1 part of the pooled supernatant mixture with 4 parts (by volume) of 10% acetonitrile stabiliser solution (10% v/v acetonitrile, 0.25 mg/ml ascorbic acid and 0.25 mg/ml EDTA in distilled water).

15. Decant the diluted pooled supernatant mixture into microcentrifuge tubes and centrifuge in a bench top centrifuge at a RCF of 14000 g for 10 minutes.

HPLC Analysis Conditions

Column: Luna Phenyl hexyl 5μ, 250×4.60 mm
Flow rate: 1 ml/min
Oven temperature: 30° C.
Solvents: A: 2% acetic acid in acetonitrile
B: 2% acetic acid and 0.02 mg/ml EDTA in water
Injection volume: 10
Gradient:

| Time | % Solvent A | % Solvent B | Step |
| --- | --- | --- | --- |
| 0 to 10 min | 5 | 95 | Isocratic |
| 10 to 40 min | 5-18 | 95-85 | Linear gradient |
| 40 to 50 min | 18 | 82 | Isocratic |
| 50 to 55 min | 50 | 50 | Wash |
| 55 to 75 min | 5 | 95 | Isocratic |

Quantification:

Peak area relative to a calibration curve constructed daily. Calibration curve is constructed from caffeine and the concentration of catechins is calculated using the relative response factors of the individual catechins to caffeine (from the ISO catechin method—ISO/CD 14502-2). Individual caffeine standards (Sigma, Poole, Dorset, UK) are used as peak identification markers.

Determination of Catechins and Caffeine in Juice and Beverages

The amounts of catechins and caffeine in a liquid sample are determined simultaneously by reverse-phase HPLC as follows:

Sample Preparation 1. 9 ml of the sample are taken and 1.12 ml of acetonitrile added, along with 1.12 ml of a solution of 2.5 mg/ml EDTA and 2.5 mg/ml ascorbic acid in distilled water.

2. The resulting solution is then decanted into microcentrifuge tubes and centrifuged at a RCF of 14000 g for 10 minutes.

HPLC Analysis Conditions

The HPLC analysis conditions are identical to those given above for the leaf tea.

Determination of Theaflavins in Juice and Beverages

Reversed-phase high performance liquid chromatography is used to quantify the amount of theaflavins in a liquid sample as follows:

Sample Preparation 1. 2 parts by weight of acetonitrile and 1 part by weight of a stabilising solution of 25 mg/ml EDTA and 25 mg/ml ascorbic acid in distilled water is added to 8 parts by weight of sample.

2. The diluted sample is then decanted into microcentrifuge tubes and centrifuged at a relative centrifugal force (RCF) of 14000 g for 10 minutes.

HPLC Analysis Conditions

Column: Hypersil C18, 3μ, 100×4.60 mm
Flow rate: 1.8 ml/min
Oven temperature: 30° C.
Solvents: A: 2% acetic acid in acetonitrile
B: 2% acetic acid in water
Injection volume: 10 μl
Gradient: Isocratic at 20% A and 80% B.

Quantification:

The catechins are eluted at the beginning of the chromatogram in a broad unresolved peak and the theaflavins are eluted between 5-15 min. Detection is at 274 nm. Peak area is measured relative to a calibration curve constructed daily. The calibration curve is constructed from a series of solutions containing known amounts of a tea extract previously analysed against pure theaflavin standards.

Determination of Theaflavins in Leaf Tea

Reversed-phase high performance liquid chromatography is used to quantify the amount of theaflavins in a solid sample as follows:

Sample Preparation

1. Grind the tea leaf to a fine powder using a pestle and mortar or hammer mill.
2. Place 70% (w/v) aqueous methanol in a 70° C. water bath and allow enough time to reach temperature.
3. Weigh accurately 1 part by weight of sample into extraction tube.
4. Add 25 parts by weight of the hot aqueous methanol to the tube, gently mix on a vortex mixer and then place the tube in the water bath at 70° C. for 10 minutes.
5. Remove tube from water bath and allow too cool for a few minutes.
6. Centrifuge tube at 2,500 rpm for 10 minutes using a Galaxy 16HD micro centrifuge.
7. Carefully decant supernatant into a clean graduated test tube.
8. Repeat steps 4 to 6 to re-extract the residue in the extraction tube. Combine the two supernatants and make up to 50 parts by weight by adding cold 70% aqueous methanol.
9. Add 5 parts by weight of a stabilising solution of 25 mg/ml EDTA and 25 mg/ml ascorbic acid in distilled water.
10. Decant into eppendorf tubes and centrifuge in the micro centrifuge at 14,500 rpm for 10 minutes and decant supernatant into HPLC vials.

HPLC Analysis Conditions

The HPLC analysis conditions are identical to those given above for juice and beverages.

Determination of Total Polyphenols

The total polyphenol content of a sample is determined using the Folin-Ciocalteu method as detailed in the International Standard published by the International Organization for Standardization as ISO 14502-1:2005(E).

SUMMARY OF THE INVENTION

In a first aspect, the present invention provides a process comprising the step of:
a) expressing juice from a first supply of fresh tea leaves thereby to produce first leaf residue and first tea juice;
b) subjecting the first supply of fresh tea leaves and/or the first tea juice to a fermentation step thereby to at least partially ferment the first tea juice; and
c) combining the at least partially fermented first tea juice with substantially unfermented tea material comprising active endogenous enzymes, thereby to form a mixture; and
d) subjecting the mixture to an enzyme deactivation step thereby to prevent fermentation of the substantially unfermented tea material in the mixture.

In a second aspect, the present invention provides a leaf tea product obtained and/or obtainable by the process. Such a product will have black tea character, a significant proportion of catechins in the polyphenols and display excellent infusion performance.

DETAILED DESCRIPTION

Expression of Juice

Step (a) of the process of the invention comprises expressing juice from a first supply of fresh tea leaves thereby to produce tea juice, which for convenience is referred to as first tea juice. The expression step also produces leaf residue which is separated from the tea juice, e.g. by filtering and/or centrifugation and which for convenience is referred to as first leaf residue.

As used herein the terms "first" and "second" when applied to supplies of tea leaves and/or tea juice are merely labels for conveniently distinguishing between different materials used in the process. For example, where reference is made to a second supply of tea leaves this merely means that the subject tea leaves are not the same ones as from which juice was expressed (i.e. they are not the "first supply").

If the amount of juice expressed is too low then it becomes difficult to separate the juice from the leaf residue and/or leads to an inefficient process. Thus it is preferred that the amount of expressed juice is at least 10 ml per kg of the fresh tea leaves, more preferably at least 25 ml, more preferably still at least 50 ml and most preferably from 75 to 600 ml. When referring to the volume of juice expressed per unit mass of tea leaves it should be noted that the mass of the tea leaves is expressed on an "as is" basis and not a dry weight basis. Thus the mass includes any moisture in the leaves.

The expression step can be achieved in any convenient way so long as it allows for separation of the tea juice from the leaf residue and results in the required quantity of juice. The machinery used to express the juice may, for example, include a hydraulic press, a pneumatic press, a screw press, a belt press, an extruder or a combination thereof.

The juice may be obtained from the fresh leaves in a single pressing or in multiple pressings of the fresh leaves. Preferably the juice is obtained from a single pressing as this allows for a simple and rapid process.

In order to minimise degradation of the valuable tea compounds, it is preferred that the expression step is performed at ambient temperature. For example, the leaf temperature may be from 5 to 40° C., more preferably 10 to 30° C.

The time and pressure used in the expression step can be varied to yield the required amount of juice. Typically, however, the pressures applied to express the juice will range from 0.5 MPa (73 psi) to 10 MPa (1450 psi). The time over which the pressure is applied will typically range from 1 s to 1 hour, more preferably from 10 s to 20 minutes and most preferably from 30 s to 5 minutes.

Prior to expression, the first supply of fresh tea leaves may undergo a pre-treatment including, for example, a unit process selected from maceration, withering or a combination thereof.

The first tea juice for use in the present invention is preferably relatively low in gallated polyphenols. This is apparent from the weight ratio of theaflavin (TF1) to theaflavin digallate (TF4). Preferably TF1/TF4 in the first tea juice is at least 2.0, more preferably at least 3.0, more preferably still at least 3.2 and most preferably from 3.5 to 5.0. Additionally or alternatively the amount of TF1 in the total theaflavins in the first tea juice is preferably at least 40% by weight, more preferably at least 42% by weight and most preferably from 45 to 60% by total weight of the theaflavins in the first tea juice.

Maceration prior to expression may help in decreasing the time and/or pressure required to express the desired quantity of juice. Surprisingly, however, we have found that excessive damage to the fresh tea leaves prior to expression can result in a lowering of the weight ratio of non-gallated to gallated polyphenols in the expressed juice. Therefore in one embodiment the fresh leaves are not subjected to a maceration and/or freeze-thaw process prior to or during the expression step.
Fermentation Step (b) of the process comprises subjecting the first supply of fresh tea leaves and/or the first tea juice to a fermentation step thereby to at least partially ferment the first tea juice.

In one embodiment the first tea juice is fermented after expression, for example by contacting the juice with an oxidizing agent. The endogenous tea enzymes include both oxidases and peroxidases and so the oxidizing agent is preferably oxygen, peroxide or a combination thereof. The oxidizing agent may suitably be oxygen gas or an oxygen-containing gas such as air. Additionally or alternatively the oxidizing agent may be a peroxide such as hydrogen peroxide. This embodiment is particularly preferred if the first leaf residue is to be further processed after expression to yield a substantially unfermented tea product, i.e. if the first leaf residue is to be processed to make a green tea product.

In a preferred embodiment the first supply of fresh tea leaves are subjected to the fermentation step and the juice is expressed from the fermented dhool. This embodiment is particularly preferred if the first leaf residue is to be further processed after expression to yield a fermented tea product, i.e. if the first leaf residue is to be processed to make an oolong or black tea product. A pre-requisite for fermentation of tea leaves is maceration to produce dhool. Therefore it is preferred that step (b) comprises macerating the first supply of fresh tea leaves thereby to produce dhool.

Maceration involves wounding the leaves e.g. by rolling and/or crushing the leaves i.e. to break down the plant tissue structure. In black tea manufacture this has the effect of liberating fermentable substrates and fermenting enzymes from within the plant cells and tissue. The maceration is preferably achieved by passing the fresh tea leaves through a cutting machine. Thus for the purpose of the invention the first supply of fresh tea leaves may be macerated by a maceration process using, for example, a CTC machine, rotorvane, ball mill, grinder, hammer mill, Lawri tea processor, Legg cutting machine, or tea rollers as in orthodox tea processing. Combinations of these maceration processes may also be used.

The degree of fermentation is conveniently judged by the proportion of oxidised catechins. In particular, one can measure a quantity, $C_0$, which is the amount of catechins in the fresh tea leaves prior to maceration in percent by dry weight of the fresh leaves. One can then measure a second quantity, $C_F$, which is the amount of catechins in the dhool after a given fermentation time, $t_F$, in percent by dry weight of the dhool. One can then use these values to calculate the degree of fermentation, R, as the content of catechins in the dhool at $t_F$ as a percentage of the content of catechins in the fresh tea leaves prior to maceration on a dry weight basis. In other words, the degree of fermentation can be calculated as follows:

$$R(\%) = 100 C_F/C_0,$$

such that for negligible fermentation R=100% and for complete fermentation R=0%.

We have found that fermenting the first supply of fresh leaves for a time ($t_F$) sufficient to reduce the content of catechins in the dhool to less than 50% of the content of catechins in the fresh tea leaves prior to maceration on a dry weight basis (i.e. R<50%) results in significant changes in the composition of the juice expressed from the dhool. In particular, the greater the degree of fermentation (lower R), the lower the proportion of gallated theaflavins and/or caffeine is found in the expressed juice. Preferably, $t_F$ is sufficient to reduce the amount of catechins in the dhool to less than 40% (i.e. R<40%), more preferably less than 30%, and most preferably from 25 to 0% of the content of catechins in the first supply of fresh tea leaves prior to maceration on a dry weight basis.

The exact time required to produce the desired degree of fermentation will depend, amongst other things, on the temperature of the dhool, the degree of maceration of the dhool and the supply of oxygen to the dhool. Typically, however, $t_F$ is at least 1 hour, more preferably at least 1.5 hours, more preferably still at least 1.75 hours and most preferably from 2 to 24 hours.

The preferred fermentation temperature is from 10 to 40° C., more preferably from 15 to 25° C. Too low a temperature results in a slow rate of fermentation whilst too high a temperature may result in deactivation of oxidative enzymes and/or generation of unwanted reaction products.

Preferably the fermentation is sufficient to provide black tea juice. In particular it is preferred that the fermentation is sufficient to oxidise most of the catechins in the first supply of fresh leaves. Thus, it is preferred that the at least partially fermented first tea juice comprises polyphenols and the polyphenols comprise catechins wherein the weight ratio of catechins to total polyphenols is less than 0.40:1, more preferably less than 0.30:1, more preferably still less than 0.20:1 and most preferably from 0.15:1 to 0.000:1.

Combining the Tea Juice with Unfermented Tea Material

Step (c) of the process of the invention comprises combining the at least partially fermented first tea juice with substantially unfermented tea material comprising active endogenous enzymes, thereby to form a mixture.

Despite comprising active endogenous enzymes, such as oxidases, peroxidises or a combination thereof, the substantially unfermented tea material still comprises significant amounts of catechins. Thus it is preferred that the substantially unfermented tea material comprises polyphenols and the polyphenols comprise catechins wherein the weight ratio of catechins to total polyphenols is at least 0.40:1, more preferably at least 0.50:1 and most preferably from 0.60 to 0.99:1.

In order to allow for greater process flexibility it is preferred that the substantially unfermented tea material is derived from a second supply of fresh tea leaves. Prior to combining with the first tea juice, the second supply of fresh tea leaves may undergo a pre-treatment including, for example, a unit process selected from maceration, withering or a combination thereof. In a particularly preferred embodiment the substantially unfermented tea material is dhool produced by macerating the second supply of fresh tea leaves. Additionally or alternatively the substantially unfermented tea material is leaf residue remaining after expressing tea juice from the second supply of fresh tea leaves. The juice expressed from the second supply of fresh tea leaves and the leaf residue thereby produced are conveniently referred to as second tea juice and second leaf residue respectively. Such an expression step allows for an extra product stream (i.e. the second juice stream) to be produced whilst not significantly affecting the quality of the substantially unfermented tea material for combination with the first tea juice.

The first tea juice may be combined with the substantially unfermented tea material in any amount. We have found however, that particularly desirable tea products can be prepared when the first tea juice is combined with the substantially unfermented tea material such that the resulting mixture comprises soluble tea solids derived from both the juice and tea material in roughly equal amounts. Thus it is preferred that the combination results in a mixture wherein the weight ratio of water-soluble tea solids derived from the first tea juice to water-soluble tea solids derived from the substantially unfermented tea material is in the range 5:1 to 1:5, more preferably 2:1 to 1:2 and most preferably 1.5:1 to 1:1.5.

The first tea juice may be combined with the substantially unfermented tea material without any processing of the juice following expression. Alternatively, for example, the first tea juice may be subjected to a concentration and/or dilution step prior to the combination step.

Enzyme Deactivation

Step (d) of the process comprises subjecting the mixture to an enzyme deactivation step thereby to prevent fermentation of the substantially unfermented tea material in the mixture.

A step common to manufacture of all teas is an enzyme deactivation step. Any known treatment capable of enzyme denaturation may be used to deactivate the fermentation enzymes in the substantially unfermented tea material to prevent fermentation thereof. A particularly convenient enzyme deactivation treatment is a heat treatment. For example, the mixture may be steamed and/or pan-fried.

In one embodiment, the process of the invention is used to manufacture a leaf tea product with increased amounts of water-soluble tea solids, thus allowing for increased speed of infusion of the leaf tea product. A convenient way of manufacturing such a product is by firing the mixture. Firing involves simultaneously deactivating the fermentation enzymes and drying the mixture and is, for example, conveniently performed in a fluid bed drier. The mixture is preferably dried to a water content of less than 30% by weight of the mixture, more preferably to a water content in the range of 1 to 10% by weight.

In order that the catechins in the substantially unfermented tea material undergo as little oxidation as possible the time between the step (c) of forming the mixture and step (d) of deactivating the enzymes should be kept to a minimum. In particular it is preferred that the time between steps (c) and (d) is less than 30 minutes, more preferably less than 15 minutes and most preferably from 0 to 10 minutes.

The Leaf Tea Product

The present invention provides a leaf tea product obtained and/or obtainable by drying the mixture.

Owing to the combination of fermented tea solids (from the first tea juice) and unfermented tea solids (from the substantially unfermented tea material) in the product, the tea product will comprise catechin levels intermediate between those of fermented and unfermented tea products. In addition the leaf tea product has excellent infusion performance, as determined by the amount of tea solids released from the leaf tea to an infusion liquor of freshly boiled water in 2 minutes infusion time and at a leaf to water weight ratio of 1:100.

Processing the First Leaf Residue

In order to maximise the efficiency of the process it is preferred that the first leaf residue is not discarded but is further processed to produce a commercially viable product. In a particularly preferred embodiment, the process comprises an additional step (e) wherein the leaf residue is processed to produce leaf tea.

The leaf residue may be processed to produce green leaf tea, black leaf tea or oolong leaf tea. In the case of oolong leaf tea and black leaf tea step (e) preferably comprises fermenting the leaf residue.

The manufacturing processes of green leaf tea, black leaf tea and oolong leaf tea are well known and suitable processes are described, for example, in "Tea: Cultivation to Consumption", K. C. Willson and M. N. Clifford (Eds), 1$^{st}$. Edn, 1992, Chapman & Hall (London), Chapters 13 and 14.

EXAMPLES

The present invention will be further described with reference to the following examples.

Example 1

Production of Fermented Juice

Fresh Kenyan tea leaves of *Camellia sinensis* var. *assamica* were used. The leaves were withered to a moisture content in the range 71-72% and then cut and passed through a rotorvane followed by one pass through a CTC machine with 8 teeth per inch (TPI). The dhool was then fermented for 2 hours.

The 2-hour fermented dhool was passed though a screw press (model CP12 manufactured by the Vincent Corporation). The feed rate was approximately 2500 kg/hr using a screw speed of 12 rpm and a pneumatically controlled back-pressure conical device set at 3 bar.

The pressing process resulted in the generation of two streams: a fermented residual leaf stream and a fermented juice stream. The fermented juice was collected and stored at ambient temperature (~25° C.) until required.

Production of Unfermented Leaf Residue

Another batch of fresh Kenyan tea leaves of *Camellia sinensis* var. *assamica* was used. The leaves were withered to a moisture content in the range 71-72% and then cut and passed through a rotorvane followed by one pass through a CTC machine with 8 teeth per inch (TPI).

Immediately after exiting the CTC machine, the unfermented dhool was passed though a screw press (model CP12 manufactured by the Vincent Corporation). The feed rate was again approximately 2500 kg/hr using a screw speed of 12 rpm and a pneumatically controlled back-pressure conical device set at 3 bar.

The pressing process resulted in the generation of two streams: a substantially unfermented residual leaf stream and a substantially unfermented juice stream.

Production of Leaf Tea

Immediately after pressing, the unfermented leaf residue was mixed with of the stored fermented juice. The juice was added back to the leaf residue in an amount of approximately 18 liters of juice to 20 kg of leaf residue. The mixture was then immediately dried in a fluid bed drier to a moisture content of less than 5% to yield a leaf tea according to the invention.

Infusion Performance 2 g of the leaf tea was infused in 200 ml of freshly boiled mineral water for 2 minutes and the resulting infusion compared with infusions brewed under the same conditions but using conventional Longjin green leaf tea or a Kenyan black leaf tea. The catechin content of the infusion made from the leaf tea of the present invention was similar to that of the Longjin green infusion (0.22 mg/ml catechins for infusion of the inventive leaf tea compared with 0.25 mg/ml for the Longjin infusion). However, the colour of the infusion made from the leaf tea of the present invention was close to that of the Kenyan black infusion (Hue of 77 for infusion of the inventive leaf tea compared with 74 for the Kenyan black infusion). Furthermore, the total amount of tea solids delivered by the inventive leaf tea was much higher than even that delivered by the Kenyan black leaf tea (3.05 mg solids per ml of infusion for the inventive leaf tea compared with 2.40 mg/ml for the Kenyan black leaf tea).

Thus the present invention allows for the provision of leaf teas which have black tea character but which deliver high amounts of tea solids to infusions made therefrom and which are capable of making infusions with catechin contents close to those of green tea infusions.

The invention claimed is:

1. A process or manufacturing a tea product, said process comprising the steps of:
   either
   a) (i) expressing juice from a first supply of fresh tea leaves thereby to produce first leaf residue and first tea juice;
   b) (i) subjecting the first tea juice to a fermentation step thereby to at least partially ferment the first tea juice;
   or
   a) (ii) subjecting a first supply of fresh tea leaves to a fermentation step to produce fermented dhool;
   b) (ii) expressing juice from the fermented dhool thereby to produce at least partially fermented first tea juice; and
   c) combining the at least partially fermented first tea juice with unfermented tea material comprising active endogenous enzymes, thereby to form a mixture; wherein said unfermented tea material is a second supply of fresh tea leaves; wherein said unfermented tea material comprises polyphenols and the polyphenols comprise catechins wherein the weight ratio of catechins to total polyphenols is at least 0.40:1; and
   d) subjecting the mixture to an enzyme deactivation step thereby to prevent fermentation of the unfermented tea material in the mixture;
   wherein the enzyme deactivation comprises firing the mixture.

2. A process according to claim 1 wherein the substantially unfermented tea material is second leaf residue remaining after expressing second tea juice from the second supply of fresh tea leaves.

3. A process according to claim 1 wherein the at least partially fermented first tea juice is black tea juice.

4. A process according to claim 1 wherein the time between the step (c) of forming the mixture and step (d) of enzyme deactivation is less than 30 minutes.

5. A process according to claim 4 wherein the time between the step (c) of forming the mixture and step (d) of enzyme deactivation is less than 15 minutes.

6. A process according to claim 1 comprising steps a)(i) and b(i).

7. A process according to claim 1 comprising steps a)(ii) and b(ii).

8. A process according to claim 1 wherein the process comprises the additional step of:
   e) processing the first leaf residue to produce leaf tea.

* * * * *